US008119238B2

(12) United States Patent
Parrish

(10) Patent No.: US 8,119,238 B2

(45) Date of Patent: Feb. 21, 2012

(54) SELF-HEALING WIRE INSULATION

(75) Inventor: Clyde F. Parrish, Trinity, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 991 days.

(21) Appl. No.: 11/856,218

(22) Filed: Sep. 17, 2007

(65) Prior Publication Data

US 2008/0234463 A1 Sep. 25, 2008

Related U.S. Application Data

(62) Division of application No. 10/684,064, filed on Oct. 8, 2003, now Pat. No. 7,285,306.

(60) Provisional application No. 60/464,050, filed on Apr. 18, 2003.

(51) Int. Cl.
*B32B 5/00* (2006.01)

(52) U.S. Cl. .................................. 428/402.24; 523/201

(58) Field of Classification Search ..... 428/402–402.24; 427/213.3–213.36; 264/4–4.7; 523/201
See application file for complete search history.

(56) References Cited

U.S. PATENT DOCUMENTS 4,698,583 A 10/1987 Sandberg
5,043,419 A * 8/1991 Ohta et al. .................... 528/353
5,073,295 A * 12/1991 Bruttel et al. ............ 252/301.19
5,117,809 A 6/1992 Scaringe et al.
5,632,326 A * 5/1997 Gough .......................... 164/529
5,729,424 A * 3/1998 Sharp et al. .................... 361/273
5,965,109 A * 10/1999 Lohrmann ................... 424/9.52
6,184,473 B1 2/2001 Reece et al.
6,527,849 B2 3/2003 Dry
6,534,715 B1 3/2003 Maunder et al.
6,548,763 B2 4/2003 Kaltenborn et al.
2004/0007784 A1* 1/2004 Skipor et al. .................. 257/788
2005/0136257 A1 6/2005 Easter

FOREIGN PATENT DOCUMENTS

DE 1 590 958 5/1970
WO WO 02/13786 A2 2/2002

OTHER PUBLICATIONS

White, et al., "Autonomic healing of polymer composites," Nature, vol. 409, 794-797, Feb. 15, 2001.
Wool, R. P., "A material fix," Nature, vol. 409, 773-774, Feb. 15, 2001.

* cited by examiner

*Primary Examiner* — James J Seidleck
*Assistant Examiner* — Saira B Haider
(74) *Attorney, Agent, or Firm* — Randall M. Heald; Jennifer P. Yancy

(57) ABSTRACT

A self-healing system for an insulation material initiates a self-repair process by rupturing a plurality of microcapsules disposed on the insulation material. When the plurality of microcapsules are ruptured, reactants within the plurality of microcapsules react to form a replacement polymer in a break of the insulation material. This self-healing system has the ability to repair multiple breaks in a length of insulation material without exhausting the repair properties of the material.

6 Claims, 2 Drawing Sheets

SELF-HEALING WIRE INSULATION

CROSS-REFERENCE TO RELATED APPLICATION

This application is a divisional of U.S. patent application Ser. No. 10/684,064, filed Oct. 8, 2003, Now U.S. Pat. No. 7,285,306, issued on Oct. 23, 2007, and claims priority to U.S. Provisional Patent Application Ser. No. 60/464,050 filed Apr. 18, 2003, which are commonly assigned and herein incorporated by reference.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

The present invention relates to a self-healing system, primarily for repairing a break in an insulation material, including a plurality of microcapsules containing at least two reactants that form a polymer upon the rupturing of the microcapsules.

2. Description of Related Art

An electrical conductor generally contains electrical wires that are protected by surrounding the electrical conductor with an insulation material. Due to various stresses applied to the electrical wires and insulation material, a break may occur in a portion of the insulation material. Often, this break is not observed or even monitored. Additionally, any such break in the insulation material may, because of inaccessibility, be difficult to repair. Insulation breaks can cause the electrical wires to short, thus acting as a source of ignition if combustibles are present. Additionally, the breaks may lead to the prevention of power transmission, the monitoring of a transducer or the control of a relay valve. This, in turn, may lead directly to a catastrophic breakdown of an electrical system. Typically, a break in the insulation material may go undetected for an extended period of time before an electrical problem occurs, which may endanger the entire electrical system. For example, catastrophic failures could occur if the electrical system is present in aircraft and spacecraft, such as the NASA space shuttle.

Conventional methods of repairing the insulation material result in a repair that has a much larger diameter than the original insulation material and the thermal properties of the repaired insulation material are diminished. For example, Boeing procedure OEL (orbiter electrical)-4000-Wire/Cable: Mystik Tape Repair for 0-10 AWG Single Application requires that twelve layers of Mystik 7503 (Teflon tape, ½ inch wide, pressure sensitive adhesive) are wrapped over the break in the insulation material. Then the end of the Mystik 7503 tape wrap is secured with a spot tie. The type of insulation material repaired by this procedure is not specified, but regardless, the pressure sensitive adhesive will creep under a constant load at elevated temperatures. In another example, Procedure OEL-4020-Wire/Cable: Clamshell Repair of Primary Insulation, the area around the break in the insulation material is abraded with 320-grit sandpaper. A sealing sleeve, which has an inner sealing and an outer insulating sleeve, is cut lengthwise and the two sleeves are separated. The sleeves are placed over the break in the insulation material and the slits are aligned 180 degrees apart. The sealing sleeve is clamped tightly with a tweezer-clamp. A heat gun is used to heat the tweezer clamp until the sealing sleeve oozes out both ends of the clamp. The procedure cautions that great care must be taken to prevent damage to surrounding wiring or other objects. In this case, the heat gun used to melt the sealing sleeve risks damage to surrounding materials. In the examples given above either the strength of the insulation material after repair is greatly reduced or there is risk that heat damage may occur to surrounding materials due to the heat gun.

The primary insulation material used in the NASA Space Shuttle and aircraft are polyimides, preferably KAPTON, and polyfluorocarbons, preferably TEFLON. Both of these materials are chemically inert, have high working temperatures, and good electrical insulating properties. KAPTON, developed by DuPont, is the primary insulation material used in commercial and military aircraft. There is a series of KAPTON polyimide polymers that have the general chemical structure that is given below in Formula 1:

(1)

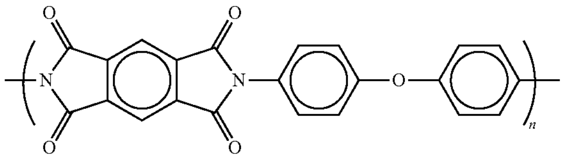

Polyimides can be prepared by reacting dianhydrides with diamines to yield poly(amic acids). Once the poly(amic acids) are heated, a rearrangement occurs followed by a loss of water to produce the polyimides. This chemistry was successfully commercialized by DuPont under the trade name of KAPTON. There are a number of KAPTON products produced by DuPont that have a range of physical properties. These properties range from materials that have no melting points, i.e. they decompose before they melt, to copolymers that are heat-sealable. There are many examples published in the chemical literature that describe methods of preparation of polyimides. The materials can be prepared in a two-step process as described above or a single step process can prepare them.

A large number of polyfluorocarbons, such as TEFLON, are known and the methods of synthesis have been well documented in the literature. Most of the preparation procedures for fluorocarbon polymers start with gas-phase reactions at high pressures. Preparation of these materials would not be practical on a small-scale, which means that it is unlikely that a direct synthesis method could be found for the polyfluorocarbons. However, heat-sealable materials are commercially available, as indicated in the discussion above under the clamshell repair method.

Many chemical reactions are exothermic, i.e., combustion processes, which rely on oxygen in the air to react with a fuel. Other materials release heat when two reagents are combined, as illustrated by the hypergolic reactions that occur when hydrazine is reacted with nitrogen tetroxide. These reactions can occur in the gas, liquid, or solid phases and their rates cover a wide range. Some compounds react under very controlled conditions to produce products that are non-hazardous and/or non-toxic. For example, development of the chemical heater for the United States Army meals-ready-to-eat (MRE) led to a number of controlled reactions that may only require water to initiate the exothermic reaction. For repair systems that require local heating to melt a specific material or to stimulate a polymerization or rearrangement reaction, chemical heaters could be the solution. This approach would apply the heat energy to the specific location and minimize the impact to other components.

While there is no known self-repairing electrical insulation material, there has been some recent investigation with composite materials. In particular, it is known to encapsulate a reactive monomer and disperse a polymerization catalyst in the structural composite. The arrangement of dispersing the catalyst in the structural composite requires that the reactive monomer diffuse through the structural composite before a repair can be initiated. Therefore, it would be advantageous to devise a self-healing system for insulation material that works immediately after the break in the insulation material occurs.

BRIEF SUMMARY OF THE INVENTION

The present invention is directed toward a self-healing system whereby a force, or a stress, that causes a break in an insulation material serves to initiate a self-repair process. It is recognized that the force from an impact is not the only source of insulation break, e.g., the break could result from stress-cracking due to aging or heating. As a result of the stress caused by the break or other forces, insulation fluids containing a replacement polymer flow into the break in the insulation material and begin the self-repair process. The self-healing system is similar in size to an initial insulation material and preferably should have similar insulating and strength characteristics. The self-healing system has the ability to repair multiple breaks in a length of insulation material without exhausting the repair properties of the material.

The self-healing system includes a plurality of microcapsules containing reactant that may be applied to the insulation material in a number of ways. For example, a wire conductor may be used to disperse the microcapsules into layers of the insulation material during its manufacture. Alternatively, a repair kit may be produced that includes a material containing the microcapsules. The preferred repair kit provides for the manual application of the self-healing system to a break in the insulation material. Once the material containing the microcapsules is applied, a sufficient stress is produced to cause the microcapsules to rupture, initiating the self-repair process. If a repair kit is utilized, the microcapsules are preferably coated on a plastic strip to form a repair tape that would be wrapped around a break in the insulation material.

The ability to self-repair a break in insulation material is a unique attribute of the present invention. Likewise, the present invention provides the added safety advantage of eliminating a single point failure that often occurs with electrical wiring.

Although the present invention may be used in a variety of electric systems, the present invention has clear application to the spacecraft and aircraft industries where severe, if not fatal, consequences may occur due to compromise of electrical insulation material at a critical stage of operation of the aircraft or spacecraft.

BRIEF DESCRIPTION OF THE SEVERAL VIEWS OF THE DRAWING(S)

The features and advantages of the present invention will become apparent from the following detailed description of a preferred embodiment thereof, taken in conjunction with the accompanying drawings, in which.

DETAILED DESCRIPTION OF THE INVENTION

A self-healing system for self-repairing a break in an insulation material is formed using a plurality of microcapsules containing reactants that form a replacement polymer upon rupturing of the microcapsules. Preferably, at least two reactants, known herein as a first reactant and a second reactant, are contained within the self-healing system. The preferred microcapsules include the following reactants: 1) a monomer and a catalyst; 2) two reactants of a condensation polymer; or 3) a fusible polymer and a chemical heater. In a preferred embodiment, the reactants are contained in a single microcapsule having a reactant shell around a reactant core. In an alternate preferred embodiment, the reactants are contained in separate microcapsules that are mixed together. Once the microcapsules are prepared, they are preferably dispersed into one layer of insulation material on a wire conductor. When the wire conductor is subjected to a stress and a break occurs in the insulation material, the microcapsules rupture and the reactants react forming an insulation fluid containing the replacement polymer, which initiates a self-repair process. The microcapsules may be combined with a foaming agent to increase the volume of the insulation fluid used to self-repair the insulation material. The insulation fluids flow into a break in the insulation material and when the reaction is complete, the break is filled with the replacement polymer, thus maintaining the integrity of the insulation material. If a number of breaks occur at different locations along the insulation material, each break would initiate the rupture of adjacently disposed microcapsules and the self-repair process would begin.

Figure 1:
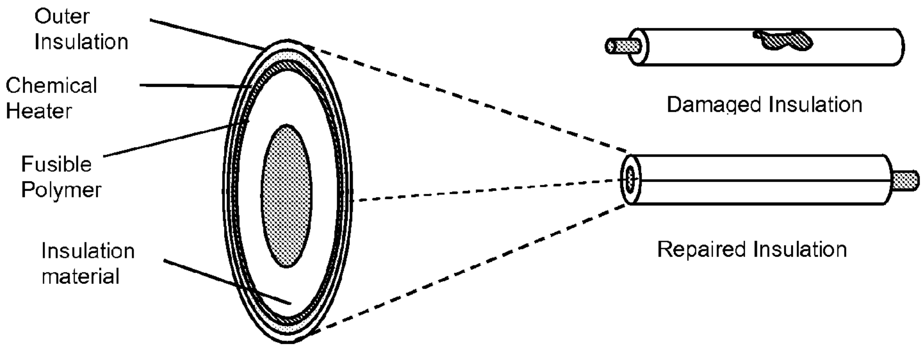
FIG. 1 is an illustration of a damaged insulation material with a repair tape over the break.

The self-healing system containing the microcapsules may be applied to the insulation material in a number of ways. For example, the plurality of microcapsules can be dispersed into a repair material. In a preferred embodiment, the repair material is itself the insulation material that surrounds the wire conductor. When the repair material is itself the insulation material, the microcapsules are dispersed in a layer of the insulation material during its manufacture. This assures that the length of insulation material includes sufficient microcapsules to self-repair any break that may occur whether or not it is accessible to monitoring. Alternatively, a repair kit may be provided including the repair material which is manually applied to a break in the insulation material at an area that does not already contain the microcapsules. After the repair material is applied to the area of the insulation material, the area is subjected to a sufficient stress to cause the microcapsules to rupture and initiate the self-repair process. If a repair kit is utilized, the microcapsules are preferably coated onto a repair material, such as a strip of material preferably a plastic strip, to form a repair tape that is wrapped about the area where the original insulation material has broken. FIG. 1 shows the preferred embodiment whereby the self-healing system is in the form of a repair tape that is wrapped around the break in a damaged insulation. In this preferred embodiment, the self-healing system contains a fusible polymer to fill the break and a chemical heater to bond the fusible polymer to the insulation material. Provisions to stabilize the replacement polymer and to retard heat loss during the self-repair process would also be included. By way of example, a repair tape including a fusible polymer containing TEFLON is formed and is bonded with a chemical heater.

In another preferred embodiment, a chemical heater system could be used to initiate the self-repair process. The chemical heater system would preferably include a plurality of microcapsules containing reactants dispersed in a water-soluble polymer. For example, a methylcellulose system that can hold water could be used to hold the microcapsules. This type of system would provide the water that is needed to initiate a reaction within the preferred chemical heater system resulting in the generation of heat. A variety of known chemical heaters may be used including, but not limited to, the chemical heaters that are used in the United States Army's Meals-Ready-to-Eat (MRE). These preferred chemical heaters are activated by water, oxygen in the air, or corona discharge that results when the wire conductor is exposed. For example, micron-sized magnesium particles that contain iron particles imbedded into their surface and a very small amount of sodium chloride could be used in this chemical heater system.

Figure 2:
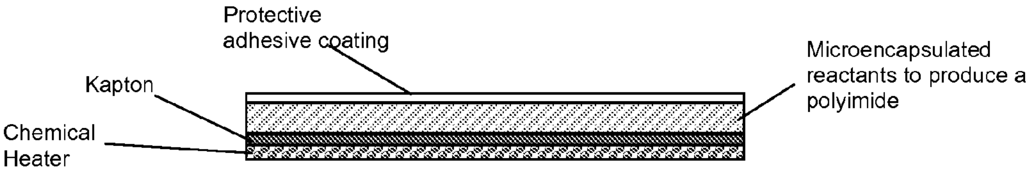
FIG. 2 is an illustration of a section of KAPTON repair tape showing the micro-encapsulated reactants that will produce the polyimide replacement polymer that bonds to the KAPTON insulation material.

A preferred self-healing system that can self-repair a break in insulation material containing a polyimide, such as KAPTON, would require either the use of a polyimide copolymer that has a softening point that is lower than the insulation material or the fabrication of a polyimide that is similar to the insulation material. FIG. 2 shows a section of this preferred self-healing system using KAPTON repair tape. The KAPTON repair tape includes micro-encapsulated reactants that react to produce a polyimide replacement polymer that bonds to the KAPTON insulation material.

Figure 3:
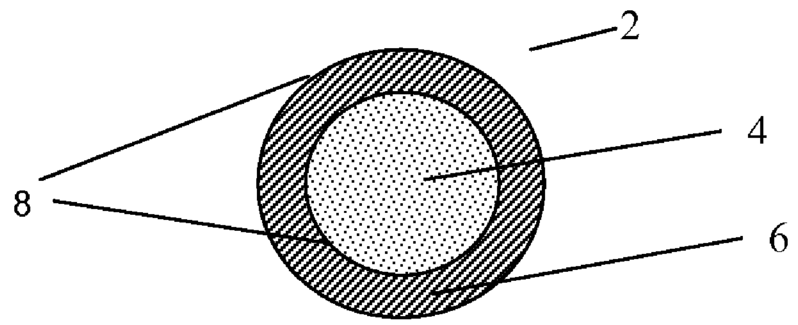
FIG. 3 is an illustration of a preferred microcapsule containing a first reactant and a second reactant.

In a preferred embodiment shown in FIG. 3, the reactants are contained in the same microcapsule 2. A first reactant is formed in a reactant core 4 and a second reactant is formed as a reactant shell 6 surrounding the reactant core 4. A polymer shell 8 is used to separate the reactant core 4 and reactant shell 6 and to cover the reactant shell 6. Microcapsules 2 may be formed using spray-drying, interfacial polycondensation, dual-wall microcapsule formation, and other known techniques for producing microcapsules. The preferred microcapsules have a size of 5 to 500 μm and contain two walls.

Numerous examples of preferred microencapsulation processes can be found in the literature. A preferred microencapsulation process is disclosed in "Microencapsulation Process in Business Form" by George Baxter, whereby microencapsulation by interfacial polycondensation is used to produce a thin, high molecular weight polymer film as the polymer shell. Essentially, the process comprises bringing two reactants together at a reaction interface between the emulsion phases where polycondensation occurs virtually instantaneously to form a thin film insoluble in the parent media of the reactants. Some classes of polymers which can be prepared by this technique and which have been used to microencapsulate a variety of materials include polyamides, polyurethanes, polysulfonamides, polyesters, polycarbonates, and polysulfonates. Virtually any material can be microencapsulated by the process provided reasonable precautions are exercised to avoid selecting materials which tend to interfere with the interfacial polycondensation reaction. The materials to be microencapsulated can be gases, liquids or solids which are water insoluble or water soluble. To control the formation of the microcapsules, one reactant for the condensation polymer, together with the material to be encapsulated, is first emulsified in a continuous phase and thereafter additional continuous phases containing the second reactant is added to the emulsion. The polymer shell will then form at the interface of the dispersed substance and encapsulate the material.

In a preferred embodiment, further described in the Experimental Data section below, two difunctional reactants are microencapsulated such that they will undergo condensation polymerization to produce a polydiamide. Each microcapsule is produced by interfacial polymerization. The reactant core preferably contains a first monomer, or first reactant, of sebacoyl chloride and the reactant shell preferably contains a second monomer, or a second reactant, of hexamethylenediamine. Each of these monomers is microencapsulated so that the first monomer forms the reactant core of the encapsulated second monomer. When the microcapsule ruptures, the microcapsules produce a replacement polymer comprising the two monomers, in this case, Nylon 6, 10.

A foaming agent may be applied to the self-healing system to increase the volume of the final, insulation fluid used in the self-repair process. The foaming agent may be contained in the same microcapsule that contains a reactant and disposed as a foaming shell around the reactant core. Alternatively, the foaming agent may be contained in separate microcapsules that are mixed with the microcapsules containing the reactants. In either case, when the microcapsules are stressed, as may occur during breakage of the insulation material, they rupture and automatically self-repair the break.

Experimental Data

Sebacoyl Chloride/Hexamethylenediamine Microcapsules

All chemicals used herein were received from Aldrich Chemical. Multiple surfactants may be used in the microencapsulation process. First, a solvent system consisting of an oil-in-water (o/w) system, wherein the oil phase was hexane, was used. The first surfactant used was Igepal CO-520, with a hydrophile-lipophile balance (HLB) number of 10.0. The amount of surfactant used was 4.6% (w/w) relative to water. Addition of hexane to a cloudy water/surfactant mixture, followed by agitation at 1500 RPM for 30 seconds, did not produce a stable emulsion. Therefore, other surfactants were investigated. Igepal CA-520 (HLB=10.0) was used and again the emulsion was not stable. Igepal CO-720 (HLB=14.2) was used and formed a more stable emulsion (stable for 2-3 minutes). Igepal CA-720 (HLB=14.6) formed an emulsion that was stable for 1-2 minutes. Gelatin formed a stable emulsion. Therefore, food grade gelatin was used for a series of experiments.

Dissolved in 12.0 ml of water were 0.075 g (0.65 mmol) hexamethylenediamine, 0.050 g (1.25 mmol) sodium hydroxide and 0.600 g (5% w/w) gelatin. To this clear, yellowish mixture was added a solution consisting of 0.275 ml (1.29 mmol) of sebacoyl chloride dissolved in 0.500 ml of hexane. This new mixture was agitated for 30 seconds at 1500 RPM. Nylon 6, 10 was formed, but mostly on the homogenizing head. It was determined that it was necessary to make a stable emulsion first and then form the polymer.

The experiment was repeated as described above with the exception that the hexa-methylenediamine was added after the emulsion was formed. The mixture formed polymer, but had a foamy consistency, i.e large amounts of foam floating on top of the solution. Examination of the mixture under a microscope showed that there were no microcapsules present. This experiment was attempted again, with the amine and base being added after the emulsion was formed. Again, polymer was formed as well as a large amount of foam. However, the presence of microcapsules, as well as gelatin, was observed. The microcapsules exploded under the intense heat of the microscope lamp. It was also apparent that the gelatin was not going to be a good surfactant to use because of the foaming problem that was occurring.

The next surfactant used was methyl cellulose. Into 10.0 ml of water was placed 0.050 g methyl cellulose. This heterogeneous mixture was placed in an 80 EC oven for 1 hour after which time it became transparent. To this clear, slightly colored mixture was added 0.500 ml of hexane and the resulting mixture was agitated at 1500 RPM for 30 seconds. A large amount of foaming was observed.

Carboxymethyl cellulose, sodium salt (CMC) was used next. Into 10.0 ml of water was placed 0.056 g CMC. This mixture was placed in an 80° C. oven for 1 hour, after which time it became transparent. To this mixture was added 0.500 ml of hexane and the resulting mixture was agitated for 30 seconds at 1500 RPM. A large amount of solids fell out of solution. It appears that the CMC is not soluble in the water/hexane mixture. Therefore, a different solvent, dichloromethane, was used for the next series of experiments.

CMC, 0.062 g, was added to 10.0 ml of water and the mixture was placed in an 80 EC oven for 1 hour. To this mixture was added 0.500 ml of dichloromethane and the new mixture was agitated for 30 seconds at 1500 RPM. A stable emulsion was formed that did not fall apart for more than 24 hours. These conditions were used for the next set of interfacial polymerization experiments.

CMC, 0.070 g, was added to 10.0 ml of water and the mixture was placed in an 80 EC oven for 1 hour. A solution consisting of 0.075 g (1.29 mmol) sebacoyl chloride dissolved in 0.500 ml of dichloromethane was then added. This new mixture was then agitated for 30 seconds at 1500 RPM. This cloudy mixture was then placed on a stir plate and stirred at 1200 RPM using a micro stir bar. A solution consisting of 0.077 g (0.66 mmol) hexamethylene-diamine and 0.053 g (1.25 mmol) sodium hydroxide dissolved in 2.0 ml of water was then added and the resulting mixture was stirred for 15 minutes. A white suspension formed. Analysis of the white suspension under a microscope showed the presence of many microcapsules, mostly between 90-200 μm in size. Surfactant, as well as a small amount of polymer, were also present.

The microcapsules still were not stable under the microscope light. It was determined that the walls of the microcapsules are too thin; therefore, a larger quantity, i.e. double, of diamine was used for the next experiment.

CMC, 0.058 g, was added to 10.0 ml of water. This heterogeneous mixture was placed in an 80 EC oven for 1 hour. To this mixture was added 0.500 ml of a solution containing 0.075 g (1.29 mmol) sebacoyl chloride. This new mixture was agitated at 1500 RPM for 30 seconds and placed on a stir plate to stir at 1200 RPM. A solution consisting of 0.154 g (1.32 mmol) hexamethylenediamine and 0.106 g (2.50 mmol) sodium hydroxide dissolved in 4.0 ml of water was then added in 4, 1 ml portions, with a portion added every 1 minute. The resulting mixture was allowed to stir an additional 30 minutes after which time it was analyzed under a microscope. A large number of microcapsules were observed, mostly in the range of 10-200 μm. The larger microcapsules (>200 Φm) exploded under the light of the microscope. However, the smaller microcapsules appeared stable. One-half volume of the mixture was gravity filtered using Whatman 42 filter paper and the solids were allowed to dry overnight in the hood. Analysis of the solids under a microscope showed no stable microcapsules; all of the spheres had broken apart or collapsed, resembling a flat soccer ball. Analysis of the remaining solids that were still in the vial showed that all of the microcapsules were still present. The solids on the slide were allowed to dry by water evaporation and analyzed under a microscope. All of the microcapsules had exploded. It is speculated that the solvent inside the microcapsules was causing the problem, because it was too volatile. Therefore, the switch to chlorobenzene was made.

CMC, 0.069 g, was added to 14.0 ml of water. This mixture was placed in an 80° C. oven for 1 hour. Chlorobenzene, 0.500 ml, was added and the new mixture was agitated for 30 seconds at 1500 RPM. The emulsion formed seemed fairly stable; very little coalescence was observed. Most of the particles in the emulsion were <200 μm. The emulsion was still stable after 30 minutes and was considered stable enough to work.

Into a vial was placed 0.053 g CMC and 10.0 ml of water was added. This mixture was placed in an 80 EC oven for 1 hour. A 0.500 ml solution of chlorobenzene containing 0.075 g (1.29 mmol) sebacoyl chloride was added and the new mixture was agitated for 30 seconds at 1500 RPM. A solution consisting of 0.154 g (1.32 mmol) hexamethylenediamine and 0.106 g (2.50 mmol) sodium hydroxide dissolved in 4.0 ml of water was added in 1 ml portions, with 1 minute between each addition. The resulting mixture was stirred at 1200 RPM on a stir plate for 30 minutes, after which time the mixture was analyzed under a microscope. The mixture contained a large number of microcapsules, mostly between 10-250 μm. The microcapsules were allowed to dry. Once dry, the particles collapsed.

The addition of a crosslinker was used to improve wall strength and minimize wall collapse. The crosslinker of choice is diethylenetriamine. The amount of crosslinker used was approximately 30% w/w. To 10.0 ml of water was added 0.062 g CMC. This mixture was placed in an 80 EC oven for 1 hour. A solution consisting of 0.075 g (1.29 mmol) sebacoyl chloride dissolved in 0.500 ml of chlorobenzene was added and the new mixture was agitated for 30 seconds at 1500 RPM. This mixture was placed on a stir plate and stirred at 1200 RPM using a micro stir bar. A solution of 0.117 g (1.01 mmol) hexamethylenediamine, 0.038 g (0.36 mmol) diethylenetriamine and 0.109 g (2.74 mmol) sodium hydroxide dissolved in 4.0 ml of water was added over 3 minutes, in 1 ml portions. The resulting mixture was stirred for 30 minutes at 1200 RPM on a stir plate. The cloudy mixture was analyzed under a microscope and showed the presence of microcapsules. The microcapsules present were between 100-300 μm. The microcapsules were allowed to dry, after which they were reanalyzed. All of the microcapsules had collapsed.

Results

Microcapsules of Nylon 6, 10 were produced using interfacial polymerization in a o/w solvent system. A photograph of the microcapsules was taken and it was shown that microcapsules are being formed. However, the microcapsules are unstable when dry and collapse, giving an impression of a deflated soccer ball.

Discussion

Microcapsules were produced using the interfacial polymerization of sebacoyl chloride and hexamethylenediamine in an oil-in-water system. However, the microcapsules formed were not stable when dried. A wide variety of surfactants were used, with the surfactant of choice being carboxymethyl cellulose, sodium salt. This surfactant gave minimum foaming and a stable emulsion in the presence of hexane, dichloromethane, and chlorobenzene. The changing of solvent did not produce more stable microcapsules. The use of a crosslinking monomer, diethylenetriamine, also did not improve stability.

A secondary polymer could be used to coat the Nylon 6, 10 coated microcapsule. This would improve the strength of the microcapsule and, if the correct polymer is chosen, could reduce the porosity of the microcapsule wall.

The examples provided herein are illustrations and are not expected to limit the methods of preparation or the materials used. Although the present invention has been disclosed in terms of a preferred embodiment, it will be understood that numerous additional modifications and variations could be made thereto without departing from the scope of the invention as defined by the following claims.

What is claimed is:

1. A self-healing system comprising, a repair material including a plurality of microcapsules, each having an outer polymer shell encapsulating a first reactant and a second reactant that react to form a replacement polymer upon rupturing of said outer polymer shell, wherein said first reactant and said second reactant are selected from the group comprising a monomer, a reactant of a condensation polymer, a fusible polymer, and a chemical heater, wherein said first reactant is a polyfluorocarbon and said second reactant is a chemical heater.

2. The self-healing system of claim 1, whereby said repair material is an insulation material.

3. The self-healing system of claim 1, whereby said repair material is a strip of material.

4. The self-healing system of claim 3, whereby said strip of material is a plastic strip.

5. The self-healing system of claim 1, whereby said first reactant and said second reactant are separated by an inner polymer shell.

6. The self-healing system of claim 5, whereby said single microcapsule comprises a reactant core including said first reactant and a reactant shell including said second reactant, said reactant shell surrounding said reactant core, and said inner polymer shell separates said reactant core and said reactant shell and said outer polymer shell surrounds said reactant shell.

* * * * *